(12) United States Patent
Desplaines et al.

(10) Patent No.: US 9,850,972 B1
(45) Date of Patent: Dec. 26, 2017

(54) PLATTER WITH IMPROVED BRAKING CONTROL

(71) Applicant: InMusic Brands, Inc., Cumberland, RI (US)

(72) Inventors: Timothy Desplaines, Woonsocket, RI (US); John O'Donnell, Fort Lauderdale, FL (US)

(73) Assignee: InMusic Brands, Inc., Cumberland, RI (US)

( * ) Notice: Subject to any disclaimer, the term of this patent is extended or adjusted under 35 U.S.C. 154(b) by 0 days.

(21) Appl. No.: 15/400,410

(22) Filed: Jan. 6, 2017

(51) Int. Cl.
| | |
|---|---|
| *G11B 19/22* | (2006.01) |
| *F16D 65/18* | (2006.01) |
| *F16D 55/02* | (2006.01) |
| *F16D 65/092* | (2006.01) |
| *F16D 121/14* | (2012.01) |
| *F16D 125/64* | (2012.01) |

(52) U.S. Cl.
CPC .............. *F16D 65/18* (2013.01); *F16D 55/02* (2013.01); *F16D 65/092* (2013.01); *G11B 19/22* (2013.01); *F16D 2121/14* (2013.01); *F16D 2125/645* (2013.01)

(58) Field of Classification Search
CPC ............ G10H 1/32; G11B 19/22; F16D 65/18
USPC .......................... 369/232; 382/119; 354/184
See application file for complete search history.

(56) References Cited

U.S. PATENT DOCUMENTS

| | | | | |
|---|---|---|---|---|
| 2016/0050494 | A1* | 2/2016 | McCorkle | G10H 1/00 381/334 |
| 2016/0140863 | A1* | 5/2016 | Hermez | G09B 15/06 84/465 |
| 2016/0189699 | A1* | 6/2016 | Garet | G10H 1/32 382/119 |

* cited by examiner

*Primary Examiner* — Allen T Cao
(74) *Attorney, Agent, or Firm* — Barlow, Josephs & Holmes, Ltd.

(57) ABSTRACT

A platter apparatus with improved braking control includes a support base where a platter is rotatably secured to the support base with a circular wall downwardly depending from the platter. An arm, which is slidably connected to the base is linearly actuatable between a first position and a second position. A brake pad is connected to an end of the arm and is in removable and adjustable frictional engagement with the circular wall to provide an amount of braking of rotation of the platter relative to the support base depending on the linear position of the arm. The brake pad is connected to the arm by a compression spring and limited by a torsion spring to enable a zero friction braking-free position.

11 Claims, 9 Drawing Sheets

PLATTER WITH IMPROVED BRAKING CONTROL

CROSS REFERENCE TO RELATED APPLICATION

N/A

BACKGROUND OF THE INVENTION

The invention relates generally to a new and novel control apparatus for a platter. More specifically, the present invention relates to rotation control of a platter in a disc jockey ("DJ") music-playing device, which may be a media player device, turntable or other device. Further, the present invention relates to rotational braking control of such a platter.

DJ devices with rotatable platters are very well known in the art. For example, turntables with platters, that support a vinyl record so that the music thereon may be played normally or by a "scratch" performance using a needle cartridge, are known. Also, DJ media players are also known where the platter does not support an actual vinyl record but rather provides a DJ-friendly control interface to interact with and control digital media, such as digital music. These media devices are also well known.

With these DJ devices, particularly the media players because their platters are not powered by a motor and freely rotate; there is a need to better control the rotation of those platters. First, there is a need to avoid rotational drift of the platter when the DJ is not manipulating it. This drift can cause the platter to rotate when it is not desired to do so thereby moving cue points or scratching audio when it is not desired to do so. Rotational platter drift is susceptible, for example, when there are high levels of vibration, such as in environments where audio is played at high volumes. These environments are common for DJ performances. Therefore, there is a desire for controlled braking of the platter.

Also, the amount of braking applied to a platter for control of DJ media device is typically a matter of personal preference of a DJ. For example, a given DJ may like a heavily braked platter so that more force is required to rotate the platter and thereby provide the scratch effect or media control. On the other hand, a DJ may prefer very light or even no added braking of the platter for a completely different feel.

In view of the above, there is a need to control the level of braking of a DJ platter. In the prior art, there have been many attempts to control the braking/torque of a platter for a DJ device. In vinyl turntables that are powered, changing of the output of the motor can control motor torque, for example. However, this is not available for DJ media devices because they do not use a motor to rotate the platter so braking of the platter must be employed.

There have been attempts in the prior art to control the braking in DJ media device platters. However, these known apparatuses are complex in construction, expensive to manufacture, are difficult to use and are susceptible to failure.

Therefore, there is a need for a DJ media apparatus to able to simulate change of motor torque by a platter braking system for controlled rotation of the platter.

There is a need for a DJ media device platter with reliable braking control that may adjust the amount of braking delivered to the platter.

There is a need for a DJ media device platter that can provide zero friction, braking-free operation, if desired.

There is a need for a DJ media device platter that is less costly to manufacture than prior art apparatus yet still provides effective fine-tuned control of the amount of braking delivered to the platter.

There is a need for a DJ media device platter that can customize the platter feel to the personal preference of the DJ.

SUMMARY OF THE INVENTION

The present invention preserves the advantages of platter rotation control in prior art DJ media devices. In addition, it provides new advantages not found in currently available DJ media devices and overcomes many disadvantages of such currently available DJ media devices.

The invention is generally directed to the novel and unique platter apparatus for a DJ media device. The platter apparatus of the present invention has improved braking control system. It includes a support base where a platter is rotatably secured to the support base with a circular wall that downwardly depends from the platter. An arm, which is slidably connected to the base is linearly actuatable between a first position and a second position. A brake pad is connected to an end of the arm and is in removable and adjustable frictional engagement with the circular wall to provide an amount of braking of rotation of the platter relative to the support base depending on the linear position of the arm. The brake pad is connected to the arm by a compression spring and the travel of which is limited by a torsion spring to enable a zero friction position and braking-free operation.

It is, therefore, an object of the present invention to provide improved braking control of a DJ platter.

A further object of the present invention is to provide a platter apparatus that is less complex in construction, less expensive to manufacture, easier to use and more reliable than prior art apparatuses.

Another object of the present invention is to provide a DJ media apparatus that can simulate change of motor torque by a platter braking system for controlled rotation of the platter.

Yet another object of the present invention is to provide braking to the platter that is adjustable.

Another object of the present invention is to provide a DJ media device with a platter that can provide zero friction, braking-free operation.

A further object of the present invention is to provide effective fine-tuned control of the amount of braking delivered to the platter.

Another object of the present invention is to provide a DJ media device platter that customizes the platter feel to the personal preference of the DJ.

BRIEF DESCRIPTION OF THE DRAWING FIGURES

The novel features which are characteristic of the present invention are set forth in the appended claims. However, the invention's preferred embodiments, together with further objects and attendant advantages, will be best understood by reference to the following detailed description taken in connection with the accompanying drawings in which:

DESCRIPTION OF THE INVENTION

Figure 1:
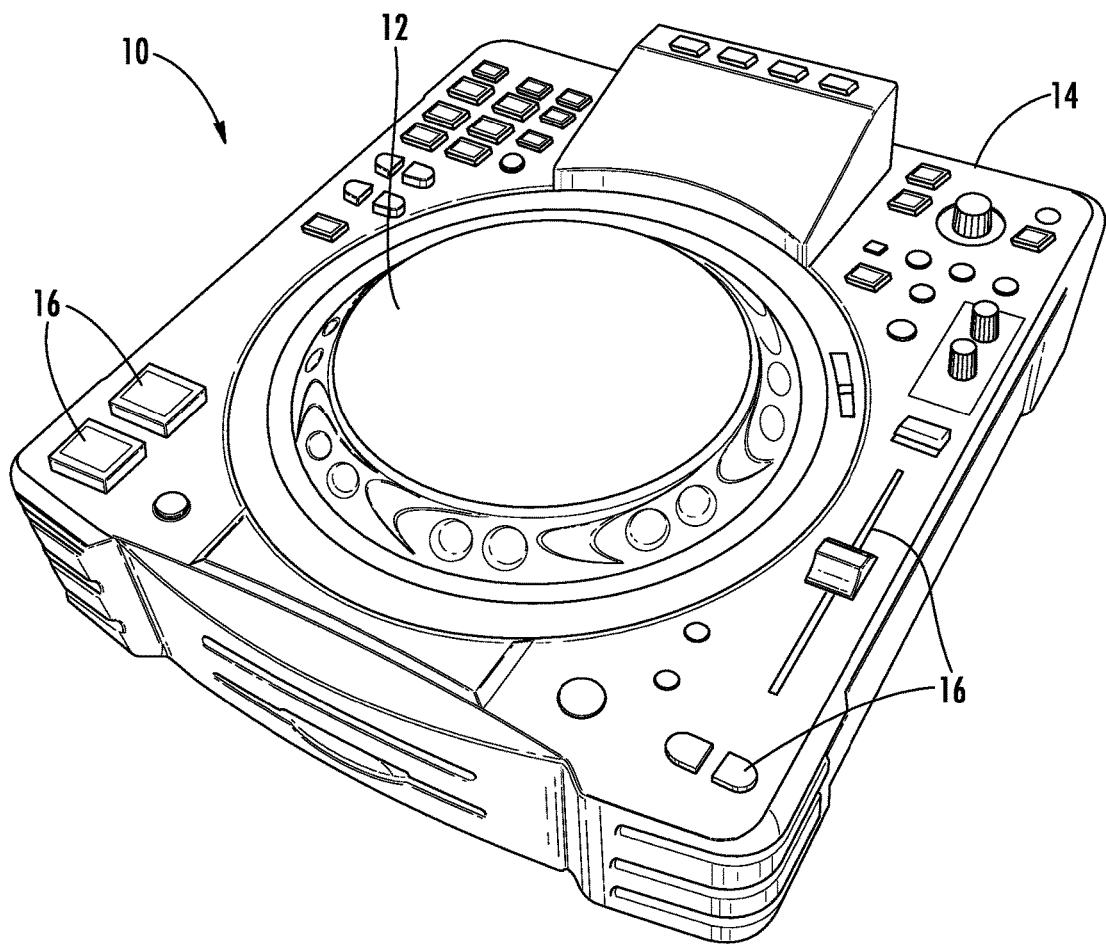
FIG. 1 is a front perspective view of a prior art DJ media device.

Turning first to FIG. 1, a perspective view of a prior art DJ media device 10 is shown. The device 10 includes the typical DJ manipulatable platter cover 12, which is connected to an underlying platter which is not shown, that is freely rotatably mounted with the underlying platter to a base (not seen in FIG. 1) that is disposed inside of housing 14. By way of example, the typical controls 16 are shown, such as a cue button, play/pause button, fader slider, and the like. Other typical controls are also provided. The prior art device 10 of FIG. 1 is one such device that can take advantage of and employ the unique platter braking system of the present invention.

Figure 2:
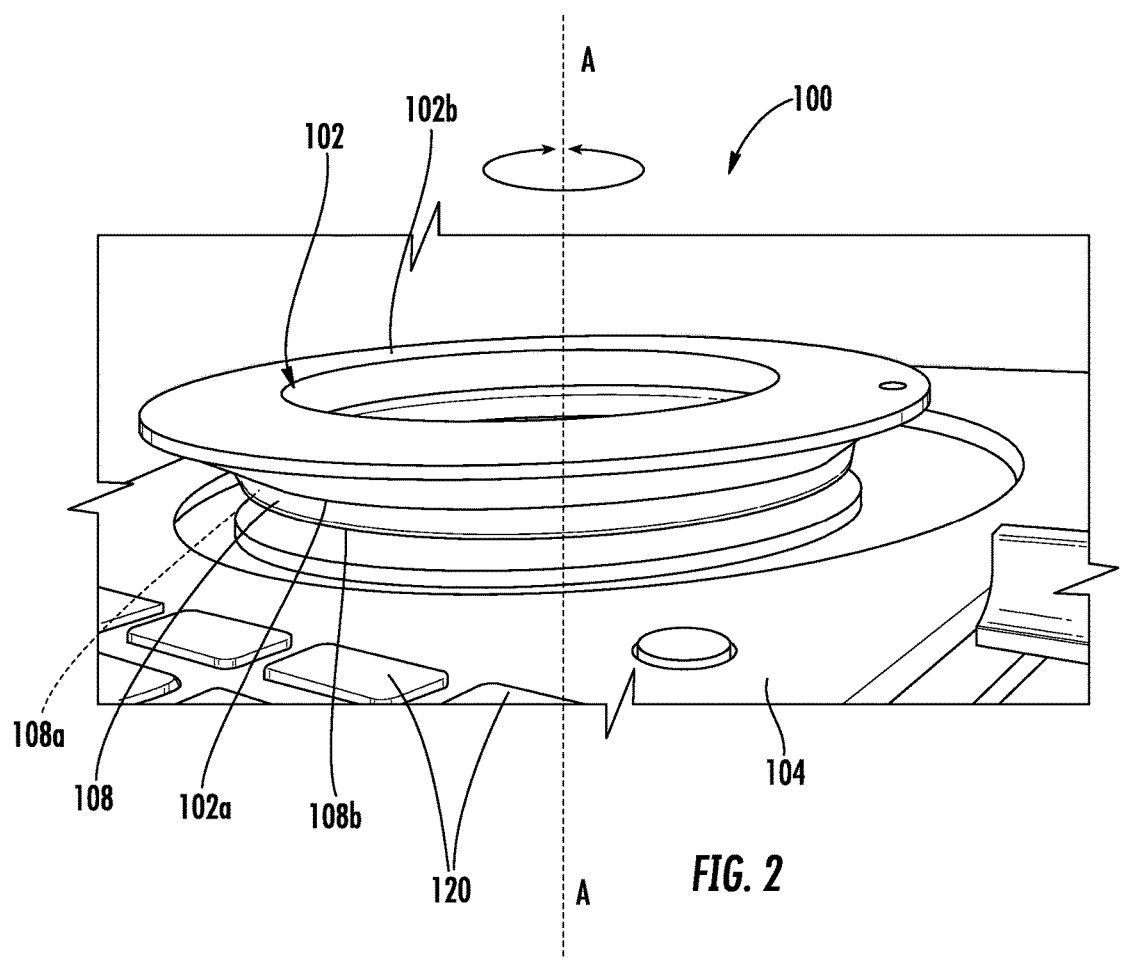
FIG. 2 is a front elevational view of a DJ media device with cover of the platter removed for illustration purposes employing the new platter braking system of the present invention.
Figure 3:
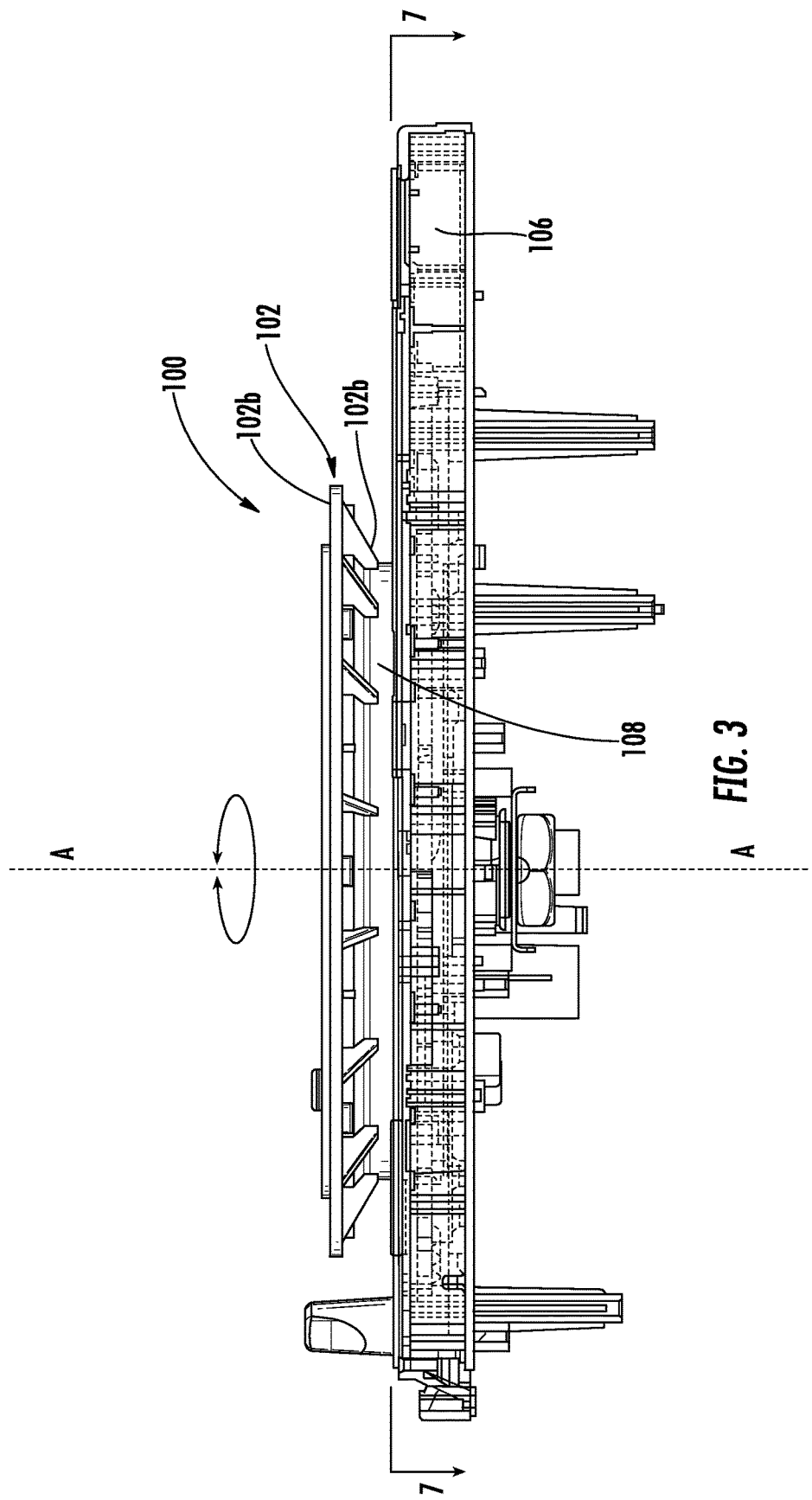
FIG. 3 is a side elevational and partial cross-sectional view of the DJ media device of FIG. 2 with cover of the platter and other housing removed for illustration purposes.
Figure 4:
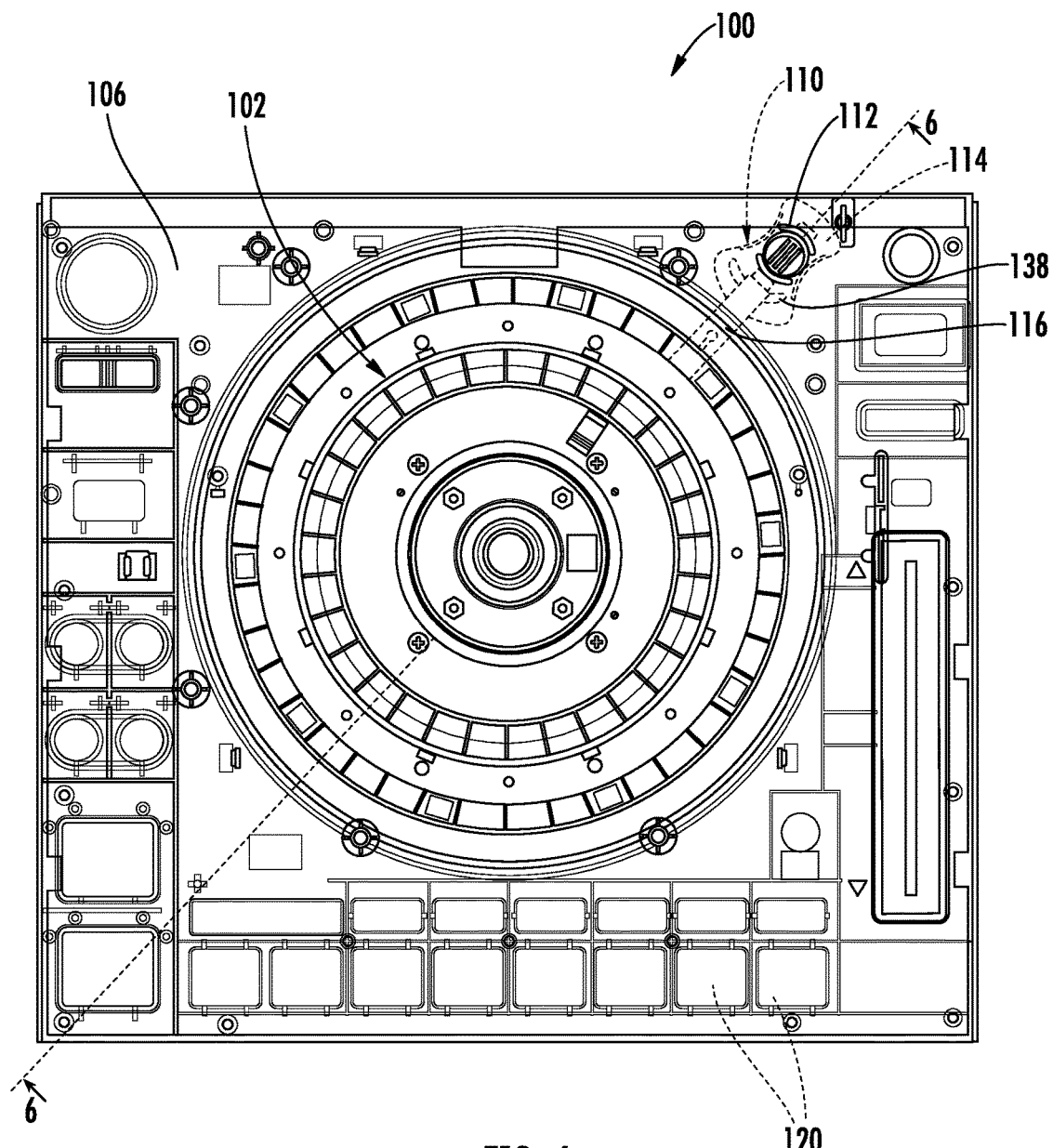
FIG. 4 is a top view of the DJ media device of FIG. 2.

Turning now to FIGS. 2-4, a top view of the DJ media device 100, with platter cover removed, can be seen. In FIG. 2, a front close-up perspective view of platter 102 of a DJ media device 100 is shown while FIG. 3 shows a side view thereof. Also, FIG. 4 shows a top view of the device 100. A typical platter cover, which is directly manipulated by a DJ, can be seen in FIG. 1. FIGS. 2-4 show the actual rotating platter 102 itself with the platter cover removed for illustration purposes. For ease of discussion herein, the platter 102 is referred to herein as the actual rotating member, such as that shown in FIGS. 2-4, but it should be understood that the platter 102 itself and the platter cover are commonly collectively referred to as the platter.

Referring to FIGS. 2 and 3, the platter 102 rotates about a platter axis, shown by the vertical line referenced A, in both the clockwise and counterclockwise directions, as referenced by the double arrow. The rotatable mounting of the platter 102 to the base 106 of the device can also be seen in other figures, such as FIGS. 3 and 6. The housing 104 about the base can be seen but it should be understood that the base 106, and housing 104 thereabout, is fixed, while the platter 102 rotates relative thereto. The base 106 typically includes the usual electronics and other structural components and the housing 104 provides and aesthetic outer structure and physical interface. These are so well known that they need not be discussed in further detail herein.

The platter 102 is generally shown to be disc-like in configuration with a first side 102a that faces the base 106 and a second side 102b that faces away from the base 106. A downwardly depending circular wall or skirt 108 is provided on the first side 102a of the platter 102. The circular wall 108 includes an inner surface 108a and an outer surface 108b.

Figure 5:
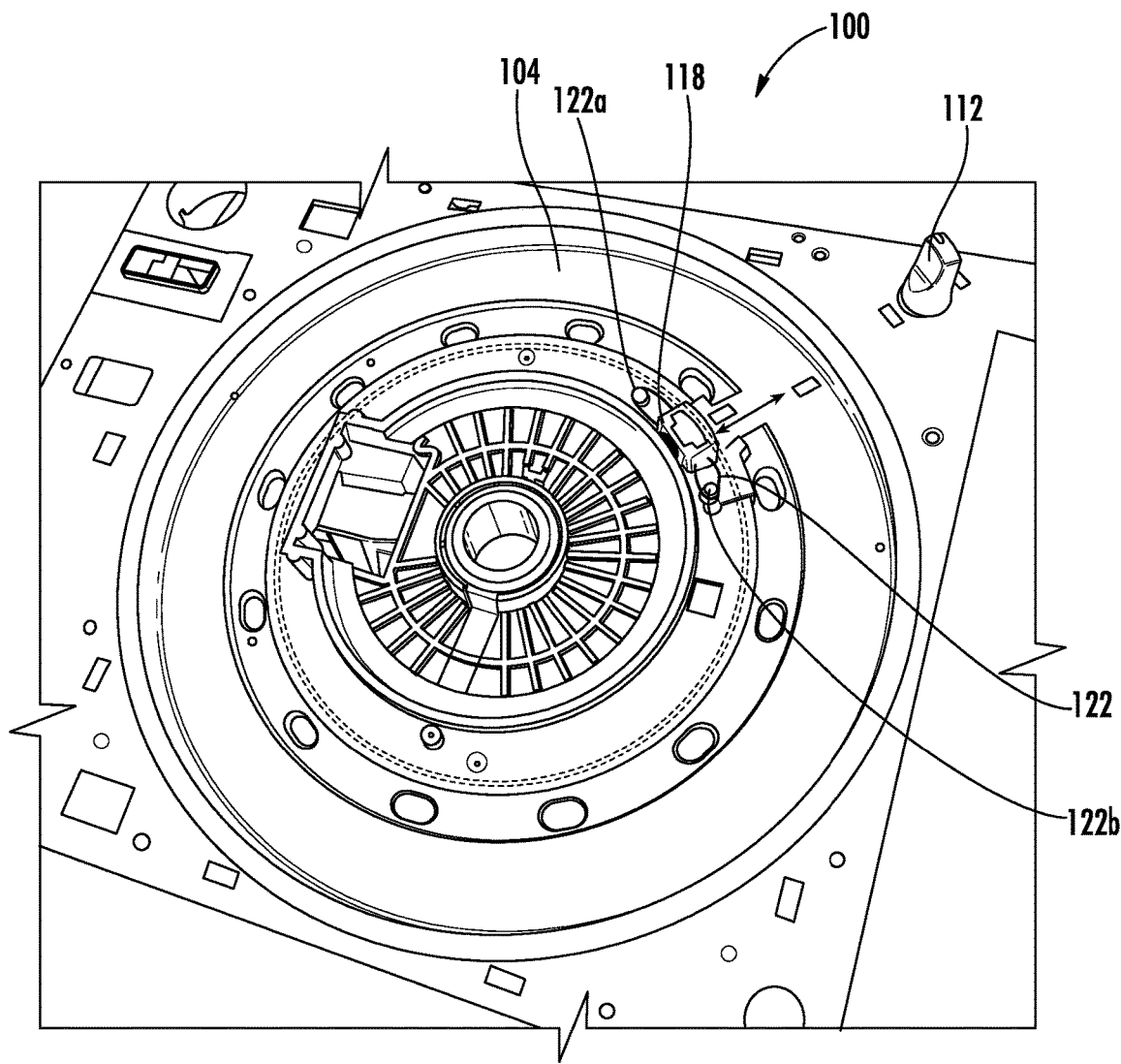
FIG. 5 is a top perspective view of the DJ media device of FIG. 2 with platter removed for illustration purposes.

FIG. 4 shows a top view of the device 100 with the housing 104 removed revealing the base 106 with the platter 102 rotatably connected thereto while FIG. 5 shows a top perspective view of the device 100 with platter 102 also removed to show the arrangement a portion of the braking apparatus, generally referred to as 110, of the present invention. More specifically, FIG. 4 shows an adjustable knob 112 that is interconnected, via a cam member 114, to an arm 116, which is in turn connected to a brake pad 118 that frictionally bears on the inner surface 108a of the circular wall 108 to achieve the desired braking. As will be further discussed in detail below, the inner surface 108a of the circular wall 108 provides the friction-bearing surface with the brake pad 118 to provide the desired braking. In the schematic drawing of FIG. 4, the knob 112, base 106 and platter 102 are shown in solid lines to illustrate that they are physically present above the base 106. The cam member 110, and arm 116 are shown in broken lines to illustrate that they are located below the base 106 and are not directly viewable in FIG. 4. The housing 104 and control knobs 120 are also shown in shadow for placement and context purposes.

FIG. 5 shows a non-schematic direct view of the device 100 with the housing 104 in place with the platter 102 removed. As result, the brake pad 118 can be seen emanating upwardly through the housing 104 from below the base 106. It should be noted that FIGS. 6-8 below show the corresponding view of the device 100 below the base 106. Still referring to FIG. 5, the adjustment knob 112 can be clearly seen which rotates the cam member 114 to linearly actuate the arm 116 to, in turn, move the brake pad 118 in and out to, thereby, adjust the amount of braking. The brake pad 118 is also spring-biased toward the center of the platter 102 by a spring 122, preferably a torsion spring, which is fixed to the housing 104 on both sides of the brake pad 118 and in communication with the brake pad 118 to urge it inwardly toward the center of the platter 102. For example, the torsion spring 122 passes on the outer side of the brake pad 118 and, due to the position of the opposing fixed portions 122a and 122b of the torsion spring 122, the desired inward spring-biasing of the brake pad 118 is achieved. The torsion spring 122 is preferably of a spring-loaded wire configuration but may be of any type of spring configuration that spring-biases the brake pad 118 inwardly.

As will be shown in detail below, the torsion spring 122 and a compression spring 124 cooperate together to control the positioning of the brake pad 118 (shown by the double arrow) relative to the inner bearing surface 108a of the downwardly depending circular wall 108 for braking. The location of the circular wall 108 is shown in broken lines in FIG. 5 for positioning purposes.

Figure 6:
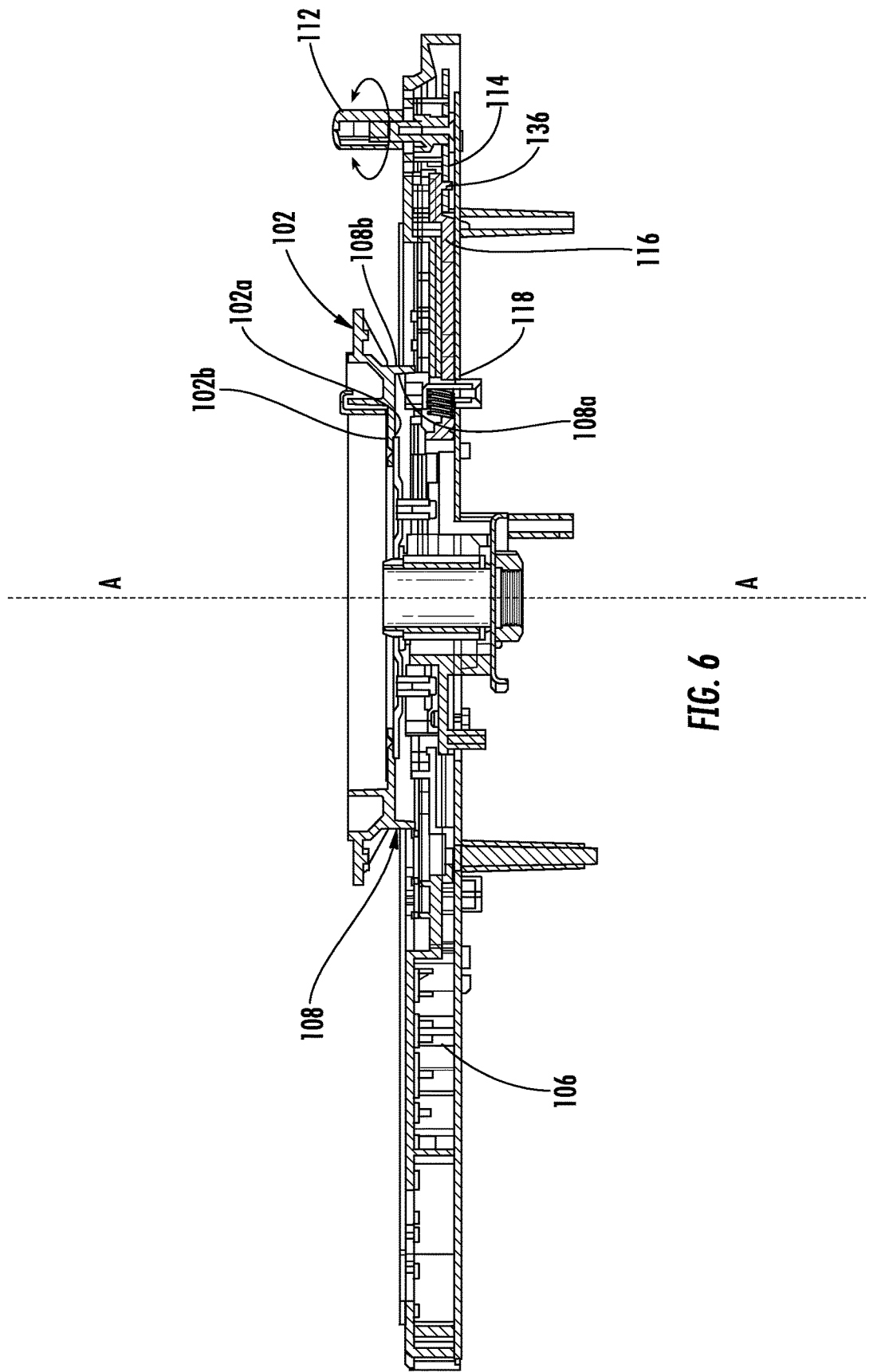
FIG. 6 is a side cross-sectional view of the DJ media through the line 6-6 of FIG. 4 showing the braking apparatus components below the base.
Figure 7:
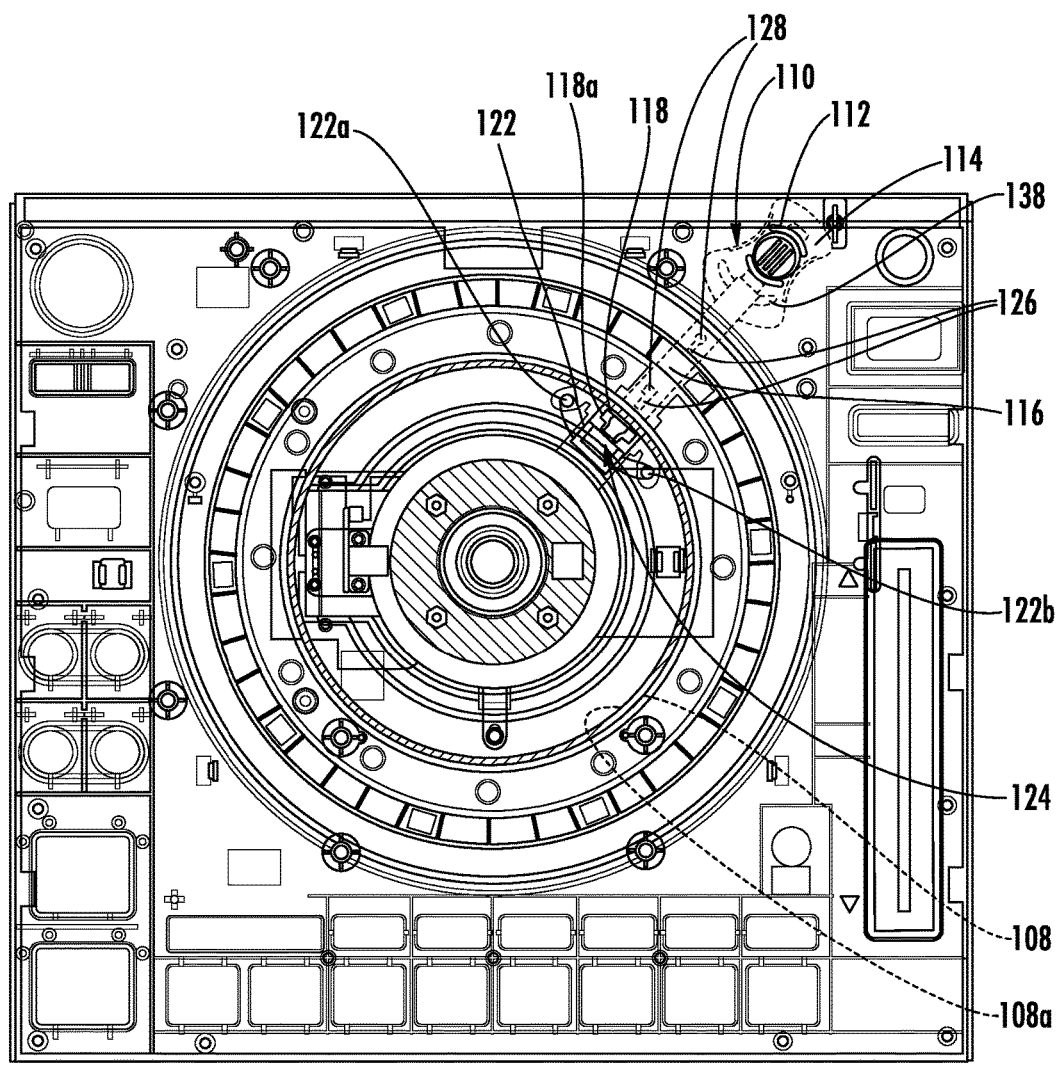
FIG. 7 is a top view of the DJ media device through the line 7-7 of FIG. 3.
Figure 8:
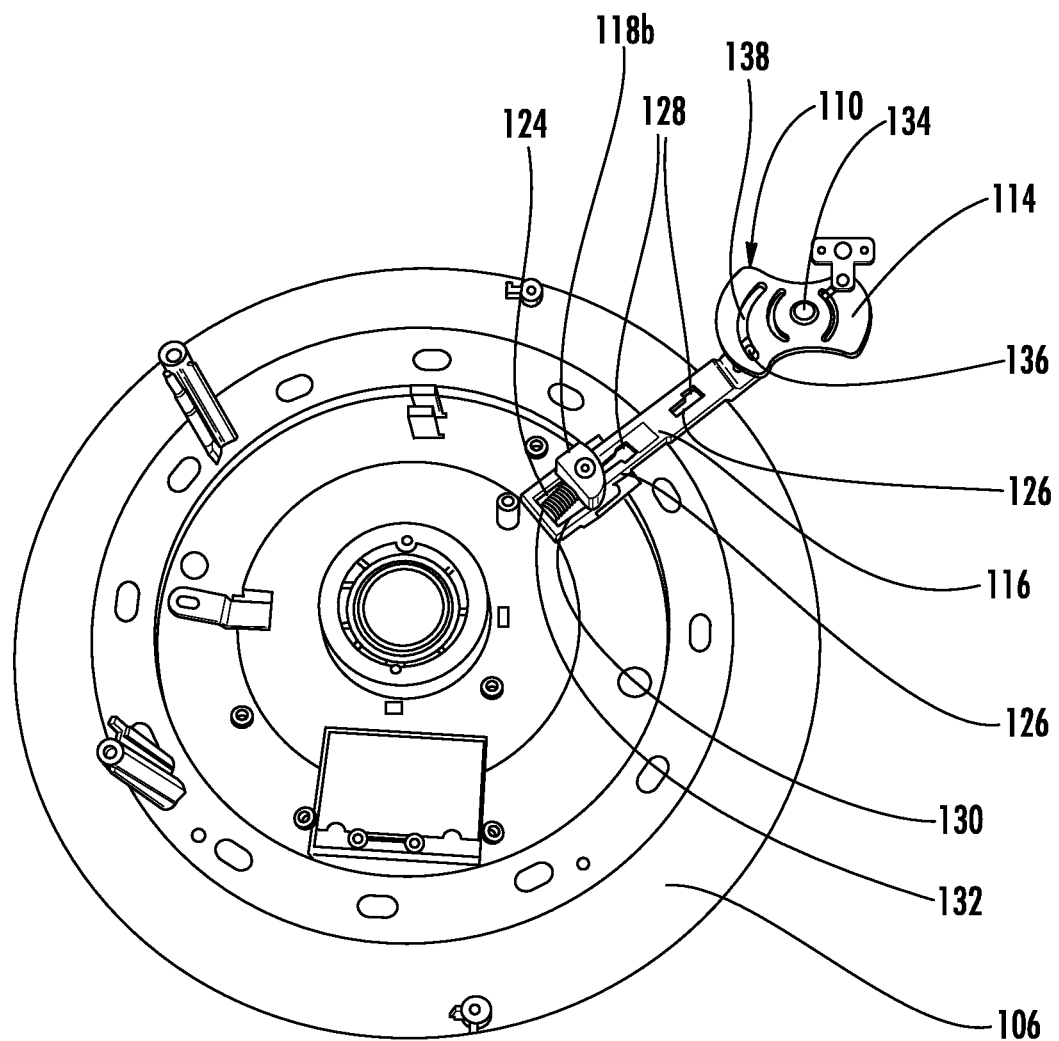
FIG. 8 is a bottom view of the DJ media device of FIG. 2 with housing removed for illustration purposes.

Referring now to FIGS. 6-8, further details of the construction and operation of the braking system 110 of the present is shown. FIG. 6 shows a cross-sectional view through the line 6-6 of FIG. 4 while FIG. 7 shows a top schematic view with downwardly depending wall 108 in broken lines and adjustment knob 112 to show positioning. The control knobs and buttons 120 on the top surface of the housing 104 are shown in shadow also to show positioning. FIG. 8 shows a non-schematic bottom view of the base 106 with housing 104 removed to reveal the braking system 110 of the present invention.

The linear actuatable arm 116 is preferably located underneath the base 106 and actuates in and out in the direction of the arrows shown in FIG. 5. As in FIGS. 7 and 8, to achieve the slidable connection to the base 106, the arm preferably includes slots 126 to respectively receive protrusions 128 of the base 106 therethrough. A first end of the arm 116 includes an open seat 130 with a spring seat 132 to receive and contain the compression spring 124 and the brake pad 118 therein. The bearing portion 118a of the brake pad 118 emanates through the top side of the base 106, as in FIG. 7, while a lower connector portion 118b of the brake pad 118 resides below the base 106, as seen in FIG. 8. Thus, the brake pad 118 is spring-biased outwardly by the compression spring 124 toward communication with the inner surface 108a of the circular wall 108 for braking. The compression spring 124 is preferably a coil spring but may be any type of spring-biasing member.

To facilitate linear actuation of the arm 116 in and out, the cam member 114 is rotatably connected to the base 106. In the bottom view of FIG. 8, the cam member 114 is rotatably connected by a pin 134, such as a screw. As seen in FIGS. 6 and 7, the knob 112 passes through the base 106 and is interconnected to the cam member 114. When the knob 112 is rotated, the cam member 114 will, in turn, rotate. The second end of the arm 116 includes a post 136 that is slidably received in an eccentric slot 138 in the cam member 114. The eccentric slot 138 defines the extent of travel, in both directions, of the arm 116 and, therefore, the extent of braking that can be delivered. Thus, when the cam member 114 is rotated, with the assistance of the adjustment knob 112, the protrusion 136 will slide within the eccentric slot 138 thereby actuating the arm 116 linearly at the same time.

Figure 9A:
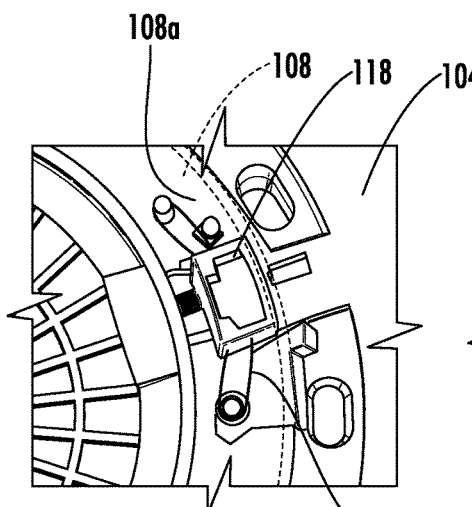
FIGS. 9A-9C show the brake pad in different levels of braking from the top of the base.
Figure 10A:
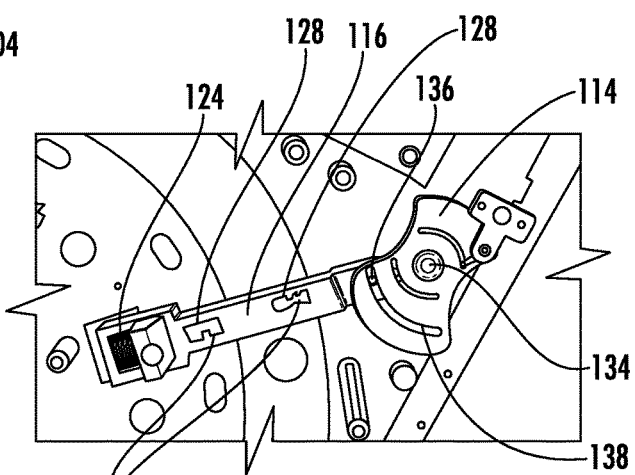
FIGS. 10A-10C show, from below the base, the arm in different amounts of actuation corresponding to different levels of braking of the brake pad as respectively shown in FIGS. 9A-9C.
Figure 9B:
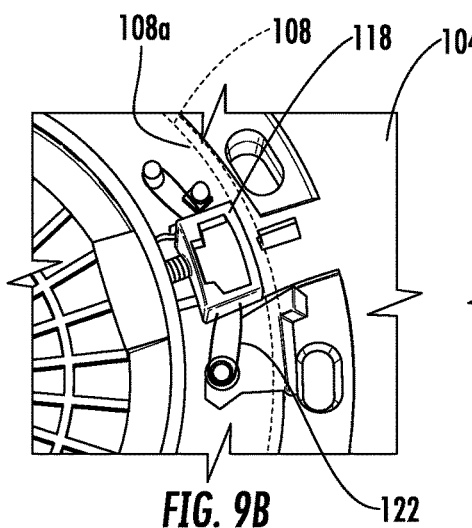
Figure 10B:
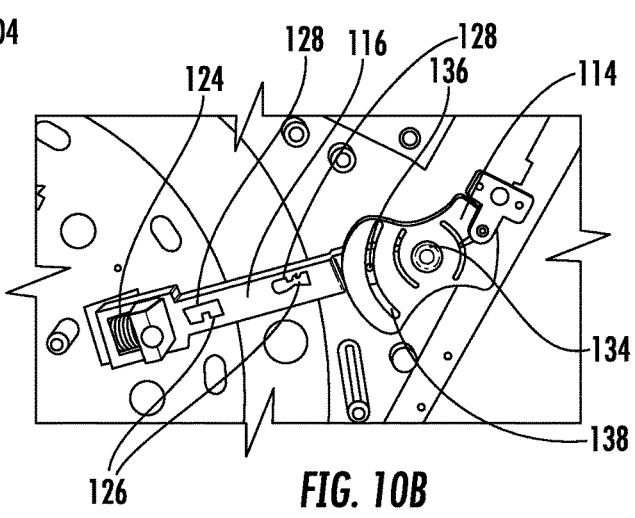
Figure 9C:
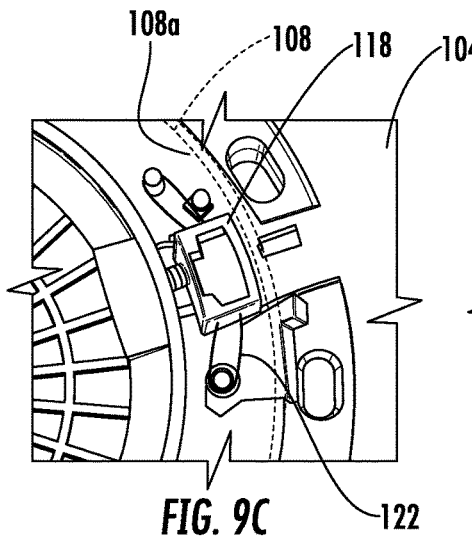
Figure 10C:
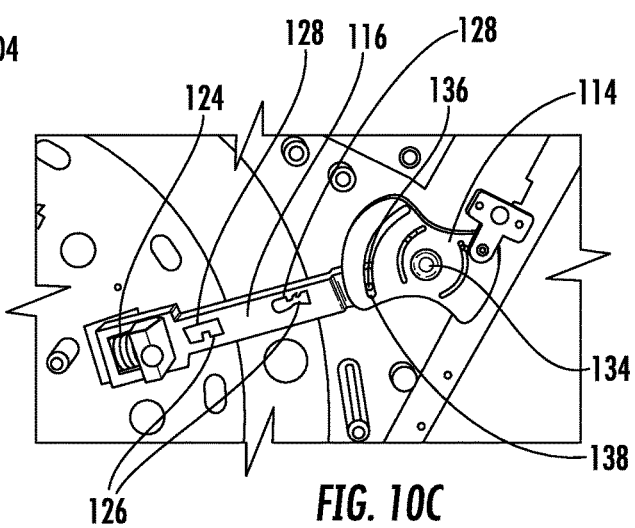

Turning now to FIGS. 9A-C and FIGS. 10A-C, details of the linear actuation of the arm 116 is shown to illustrate the different levels of braking that can be achieved with the device 100 of the present invention. First, FIGS. 9A-C show close-up top views of a media device 100 with the platter 102 removed to reveal the spring-biased brake pad assembly 118. The downwardly depending circular wall 108 is shown in broken lines for reference. FIGS. 10A-C show a bottom view of the base 106, which carries the arm 116 and cam member 114 construction.

FIGS. 9A and 10A correspond to the same positioning of the brake pad 118, namely, the full or maximum brake force where the arm 116 is actuated as far out or away from the center of the platter 102 as possible. In FIG. 9A, the brake pad 118 can be seen in firm contact with the inner surface 108a of the circular wall 108 to provide a higher relative level or amount of braking. In corresponding FIG. 10A, the post 136 emanating from the second end of the arm 116 is the most shallow portion of the eccentric slot 138 thereby pulling the arm 116 to its full extent. Also, the tabs 128 from the base 106 are in a forward position in the respective slots 126 through the arm 116.

FIG. 9B and corresponding FIG. 10B show an interim position of the linear travel of the arm 116 that achieves a middle level amount of braking. As can be seen in FIG. 9B, the brake pad 118 is pulling slightly more away from the circular wall 108 compared to what is shown in FIG. 9A. In FIG. 10B, the post 136 emanating from the second end of the arm 116 is now in the middle of the eccentric slot 138 through the cam member 114. Also, the spring 124 will be less compressed compared to what is shown in FIG. 10A because it is not as close the circular wall 108 as the condition shown in FIG. 10A. Also, as in FIG. 10B, the tabs 128 are now substantially centrally located in their respective slots 126 in the arm 116.

FIG. 9C and corresponding FIG. 10C illustrate a zero friction no braking condition for free rotation of the platter 102. In FIG. 9C, it can be seen that the brake pad 118 is fully lifted off of the inner surface 108a of the circular wall 108 and, as in FIG. 10C, the compression spring 124 will be even less compressed than what is shown in FIG. 10B because the brake pad 118 is fully lifted off of the circular wall 108. This positioning is achieved by actuating the arm 116 to its innermost position. As seen in FIG. 10C, the adjustment knob 112 is fully turned so that the post 136 on the second end of the arm 116 is moved to the deepest portion of the eccentric slot 138 thereby pushing the arm 116 even further inward toward the center of the platter 102. In FIG. 10C, the tabs 128 of the base 106 now reside in a rightmost location in their respective slots 126 thereby indicating that the arm 116 has traveled fully inwardly.

Still referring to FIGS. 9C and 10C, the use of the torsion spring 122 enables the zero friction or braking-free condition. The tension of the torsion spring 122 is tuned to prevent spring-biased travel of the brake pad 118 from the compression spring 124 past a certain predetermined amount. Thus, the torsion spring 122 contains and controls the compression spring's ability to push the brake pad 118 outwardly by defining a maximum outward travel of the brake pad 118. Otherwise, the brake pad 118 will undesirably continually provide an outward force against the circular wall 108. Therefore, when the brake pad 118 is moved inwardly enough, namely, at this last position of FIG. 9C, the brake pad 118 is effectively completely lifted off of the circular wall 108 to provide a zero friction braking-free position.

In FIGS. 9A-9C and 10A-10C, three different positions are shown, namely, a higher level of braking, a medium level of braking and also no braking at all. It should be understood that such a three-position braking system 110 is by way of example. More or less than three positions are possible and considered to be within the scope of the present invention. It is preferred that each position be identified by a click-stop/detent position; however, it is also possible that a continuous adjustment of the braking is possible. Also, the construction and location of the brake assembly 110 and structure for actuating the arm 116 in and out are just one of many different ways the brake system 110 can be constructed in accordance with the present invention. For example, alternatives to the linear actuation of the arm 116 by a cam member 114 may be employed. For example, linkages and other force translation members may be used.

The parts and components of the platter 102 with improved braking of the present invention may be made of plastic and injection molded, such as the arm 116 and brake pad assembly 118, cam member 114 and adjustment knob 112, but may be made of different materials. The compression spring 124 and torsion spring 122 are preferably made of metal but can be made of different materials. Other components, such as pins and screws, such as pin 134, are preferably made of metal but can be made of any other material, such as plastic.

In view of foregoing, an DJ media device is provided with improved braking that enables a DJ to customize the performance of the media device. This improved braking is achieved in a device that is easier and less expensive to manufacture while still achieving precision braking control.

It would be appreciated by those skilled in the art that various changes and modifications can be made to the illustrated embodiments without departing from the spirit of the present invention. All such modifications and changes are intended to be covered by the appended claims.

What is claimed is:

1. A platter apparatus with improved braking control, comprising:
   a support base;
   a platter, having a first side and a second side, rotatably secured to the support base about a platter axis; the first side facing toward the support base and the second side facing away from the support base; a circular wall downwardly depending from the first side of the platter having a wall axis substantially co-axial with the platter axis;

an arm, having a first end and a second end, slidably connected to the base; the arm being linearly actuatable between a first position and a second position;

a brake pad, connected to the first end of the arm, being in removable and adjustable frictional engagement with the circular wall to provide an amount of braking of rotation of the platter relative to the support base;

whereby linear actuation of the arm changes the amount of braking of rotation of the platter relative to the base.

2. The platter apparatus of claim 1, wherein the amount of braking is no braking.

3. The platter apparatus of claim 1, wherein the brake pad is spring-biased to the first end of the arm by a spring, the brake pad being directed away from the first end of the arm and toward the circular wall.

4. The platter apparatus of claim 3, further comprising:
a torsion spring connected to the support base and the brake pad; the torsion spring configured to spring-bias the brake pad inwardly against the forces of the compression spring.

5. The platter of claim 4, wherein position of the arm in its first position configures the brake pad to be in frictional engagement with the circular wall to provide braking to the platter; and wherein position of the arm in its second position configures the brake pad to separate from the circular wall due to the torsion spring preventing outward travel of the brake pad, thereby providing no braking.

6. The platter of claim 5, wherein the arm is adjusted between the first position and the second position to provide a plurality of levels of braking.

7. The platter of claim 1, further comprising:
a post emanating from the second end of the arm;
a movable adjustment member having a cam slot; the cam slot slidably receiving the post; and
whereby movement of the adjustment member actuates the arm.

8. The platter of claim 7, further comprising:
a knob connected to the adjustment member to facilitate movement thereof.

9. The platter of claim 7, wherein the adjustment member is rotatably moved.

10. The platter of claim 3, wherein the spring is a compression spring.

11. A platter apparatus with improved braking control, comprising:
a support base;
a platter, having a first side and a second side, rotatably secured to the support base about a platter axis; the first side facing toward the support base and the second side facing away from the support base;
an arm, having a first end and a second end, slidably connected to the base; the arm being linearly actuatable between a first position and a second position;
the first end of the arm being in removable and adjustable frictional engagement with the platter to provide an amount of braking of rotation of the platter relative to the support base;
whereby linear actuation of the arm changes the amount of braking of rotation of the platter relative to the base.

* * * * *